(12) United States Patent
Dunker (10) Patent No.: US 10,647,435 B2
(45) Date of Patent: May 12, 2020

(54) PARACHUTE SLIDER WITH STIFFENING ELEMENTS

(71) Applicant: AIRBORNE SYSTEMS NORTH AMERICA OF NJ INC., Pennsauken, NJ (US)

(72) Inventor: Garrett Storm Dunker, Houston, TX (US)

(73) Assignee: AIRBORNE SYSTEMS NORTH AMERICA OF NJ INC., Pennsauken, NJ (US)

( * ) Notice: Subject to any disclaimer, the term of this patent is extended or adjusted under 35 U.S.C. 154(b) by 768 days.

(21) Appl. No.: 14/928,886

(22) Filed: Oct. 30, 2015

(65) Prior Publication Data

US 2017/0121026 A1 May 4, 2017

(51) Int. Cl.
*B64D 17/34* (2006.01)
*B64D 17/02* (2006.01)

(52) U.S. Cl.
CPC .......... *B64D 17/343* (2013.01); *B64D 17/02* (2013.01); *B64D 17/34* (2013.01)

(58) Field of Classification Search
CPC ...... B64D 17/00; B64D 17/343; B64D 17/34; B64D 17/02; B64D 17/40; B64D 17/04; B64D 17/08; B64D 17/16; A63H 33/20; A63H 27/087; A63H 27/08
See application file for complete search history.

(56) References Cited

U.S. PATENT DOCUMENTS

| | | | | |
|---|---|---|---|---|
| 3,326,392 A * | 6/1967 | Rock | ...................... | A63H 27/08 212/71 |
| 5,005,785 A * | 4/1991 | Puskas | ................. | B64D 17/025 244/152 |
| 5,927,311 A | 7/1999 | Jager | | |
| 6,843,451 B1 | 1/2005 | Fox, Jr. | | |
| 7,997,535 B2 * | 8/2011 | Babovka | ................ | B64D 17/18 244/145 |
| 2001/0050323 A1 | 12/2001 | Brownell | | |
| 2008/0217480 A1 | 9/2008 | Berland | | |
| 2014/0121075 A1 | 5/2014 | Brown | | |

FOREIGN PATENT DOCUMENTS

DE 102013007799 6/2014

* cited by examiner

*Primary Examiner* — Jessica B Wong
(74) *Attorney, Agent, or Firm* — Jacobson Holman, PLLC.

(57) ABSTRACT

An improved slider for use with a parachute, particularly a ram-air type parachute, is provided. The slider includes a generally rectangular piece of material having grommets in the corners through which the suspension lines of the parachute run. At least one retaining structure is attached to or made in the slider material for securing one or more stiffening elements. The stiffening elements are flexible enough to allow for the packing of the parachute, but stiff enough to keep the material of the slider spread open in the fore/aft direction across the short axis of the slider and thereby prevent the slider from folding and flapping once the canopy has opened.

12 Claims, 8 Drawing Sheets

FIG. 14

PARACHUTE SLIDER WITH STIFFENING ELEMENTS

BACKGROUND OF THE INVENTION

Field of the Invention

The present invention is related to the field of parachutes and, more particularly, to an improved slider having reduced flapping and associated noise following full inflation of the parachute canopy during flight.

Description of the Related Art

Figure 1:
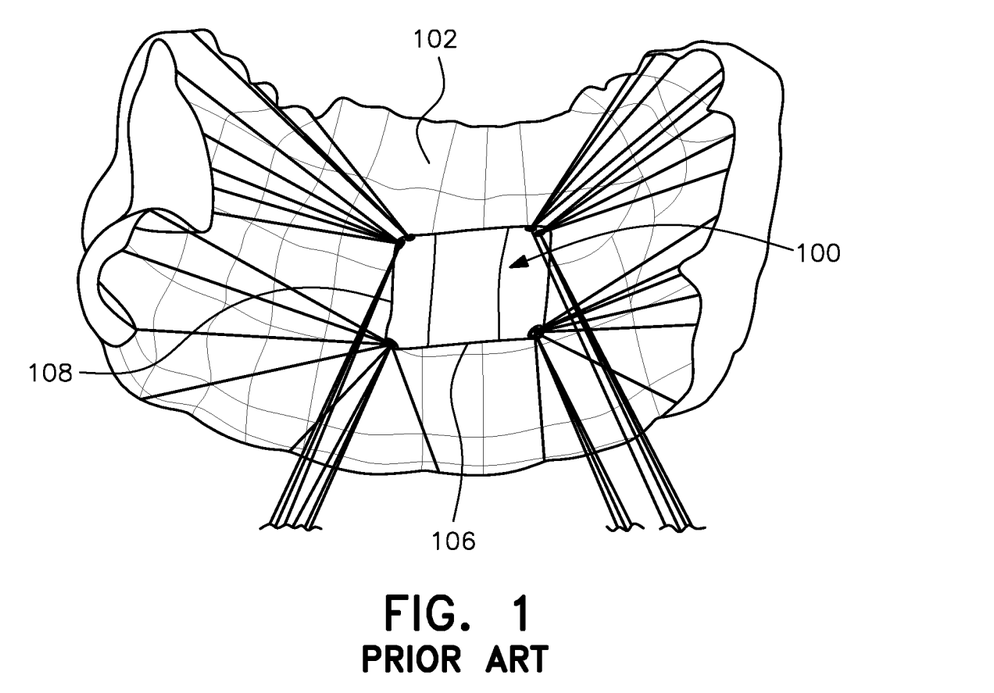
FIG. 1 is a lower perspective view of a ram air parachute with a conventional slider beginning to slide down the suspension lines.
Figure 2:
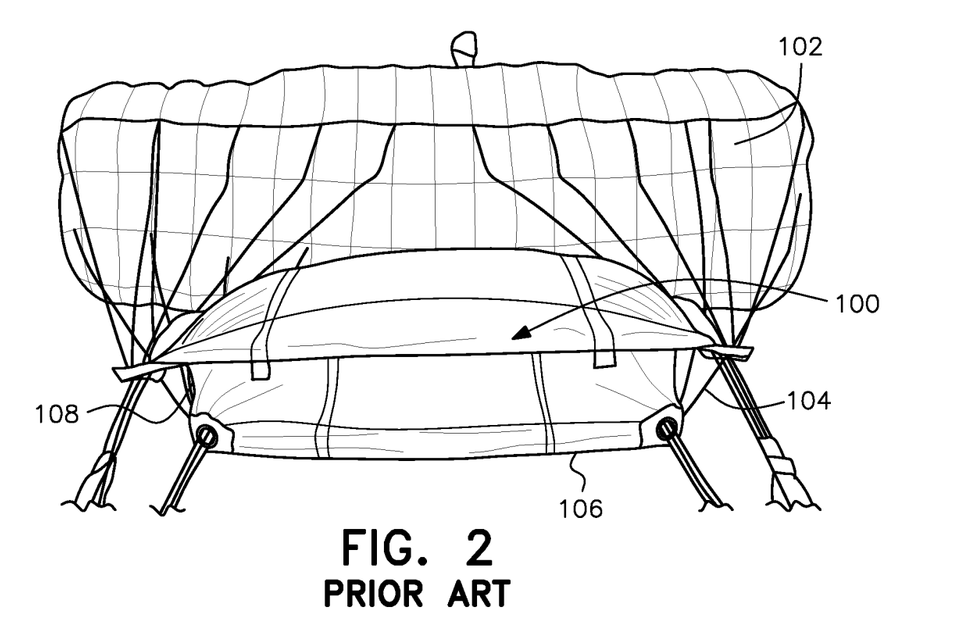
FIG. 2 is a lower perspective view of the parachute and slider shown in FIG. 1 with the slider having moved further down the lines and folding along its long axis.
Figure 5:
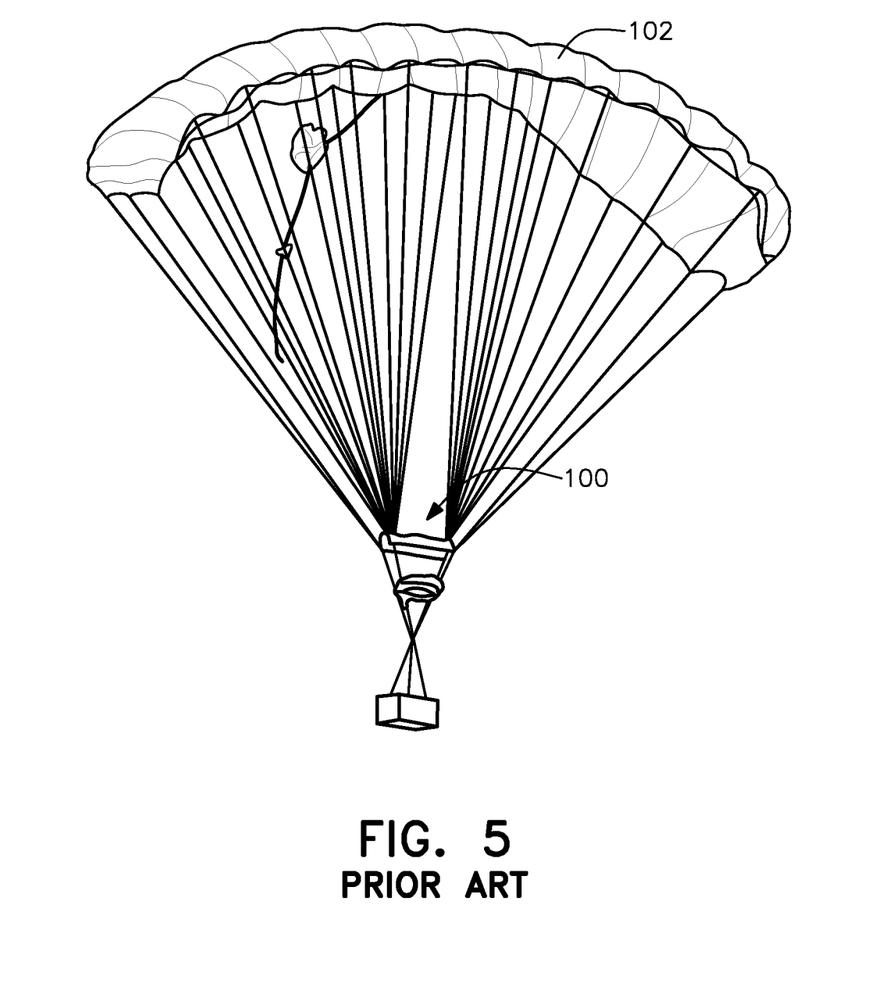
FIG. 5 is a front view of the ram air parachute and slider shown in FIGS. 1 and 2 with the canopy fully open and the slider fully exposed to the relative wind and flapping.

A slider is used to slow down and control the opening of parachutes, in particular ram-air parachutes. As shown in FIG. 1, the slider 100 is generally a substantially rectangular piece of material having a long axis 106 and a short axis 108. The slider is provided with grommets in its corners through which the suspension lines of the parachute run. When the parachute is packed, the slider is adjacent the bottom side of the canopy 102. During the opening of the parachute following deployment thereof, the canopy spreads out and pushes the slider downwardly away from the canopy to the risers as shown in FIG. 2. Initially, the slider is kept taut by the suspension lines 104 that run through the grommets, the suspension lines being pulled outwardly by the opening canopy. Once the parachute is fully inflated, however, the slider is located at a lower position on the suspension lines well beneath the canopy (see FIG. 5). Because the suspension lines converge toward the payload, the slider body is no longer under tension along the short axis thereof. Thereafter, during flight of the parachute, the slider, which faces the relative wind leading with the long axis 106, has a tendency to flap because of the absence of sufficient "fore/aft" or "short axis" stiffness to keep the slider material spread open. This flapping movement creates some degree of noise which is undesirable in some applications. For example, during military operations, slider noise could reveal a strategic military position and/or the presence of resupply activities.

Figure 3:
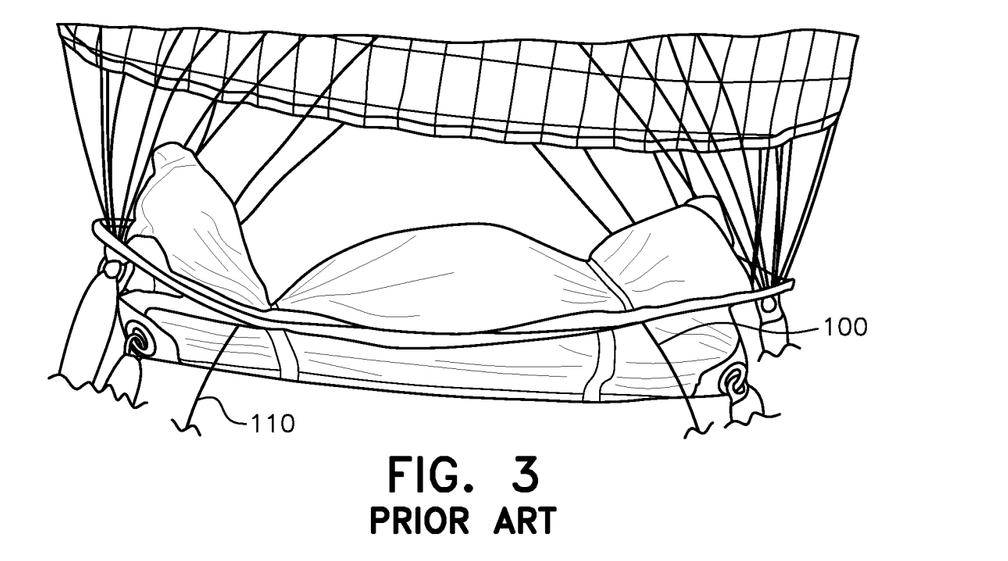
FIG. 3 is a lower perspective view of a manned parachute and a conventional slider in which the slider has moved down the suspension lines and reached the risers to leave slack along its short axis, and the jumper has begun to pull in draw strings to collapse the slider.
Figure 4:
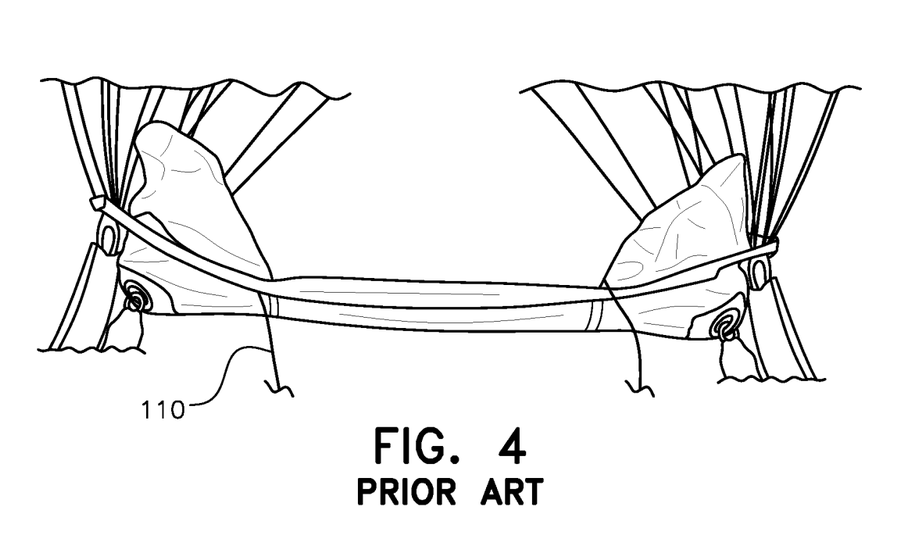
FIG. 4 is a lower perspective view of the slider shown in FIG. 3 after the slider has been fully collapsed by the jumper using the draw strings.

When the parachute is being used by a jumper, the jumper is able to collapse the slider to eliminate the noise. In general, as shown in FIGS. 3 and 4, the jumper does this by pulling down on two draw strings 110 which, in turn, compresses or bunches the slider along the short axis and reduces the surface area that is exposed to the relative wind.

Figure 5A:
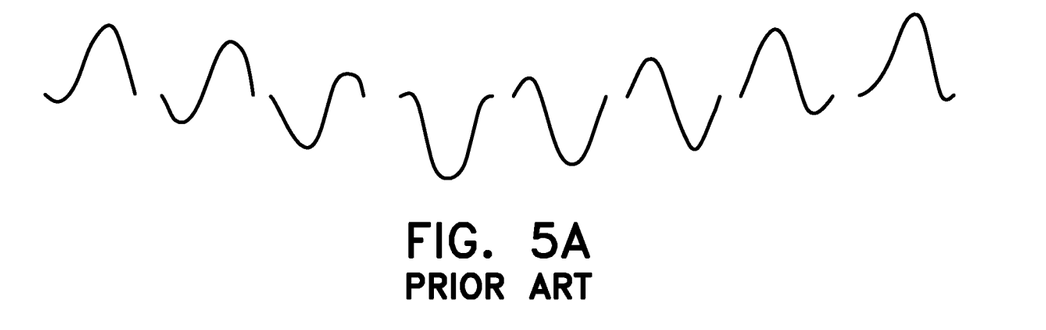
FIG. 5A is a sketch of a side cut-away view of the flapping slider shown in FIG. 5.

When ram-air parachutes are used by unmanned payloads, however, it is not possible to manually act upon the slider after the parachute has opened. As a result, the slider remains fully exposed to the relative wind and is free to flap, the slider flapping up and down along its short axis, as shown in FIGS. 5 and 5A, again creating an undesirable degree of noise. The same problem can, of course, occur with a manned parachute if manual collapse of the slider by the jumper is not convenient or possible.

Therefore, a need exists for a parachute slider that is prevented from flapping and creating undue noise after the canopy has opened.

SUMMARY OF THE INVENTION

In view of the foregoing, the present invention is directed to a slider for use with unmanned parachutes, as well as manned parachutes, particularly with ram-air type parachutes. The slider includes a generally rectangular piece of material having grommets in the corners through which the suspension lines of the parachute run. At least one retaining structure is attached to or made in the slider material for securing a stiffening element. The retaining structure and the stiffening element run parallel with the short axis of the slider. The stiffening element is flexible enough to allow for the packing of the parachute, but resilient and stiff enough when unflexed, as when the slider and canopy are released at deployment, to keep the material of the slider spread open and thereby prevent the slider from flapping once the canopy has opened.

Accordingly, it is an object of the present invention to provide an improved parachute slider having reduced flapping movement and associated noise following opening of the canopy during parachute deployment.

Another object of the present invention is to provide an improved slider in accordance with the previous object that includes at least one stiffening element that can be flexed to allow for packing of the parachute and slider but that, when unflexed, has sufficient stiffness along the slider's short axis to keep the slider spread open and prevent flapping thereof during flight.

A further object of the present invention is to provide an improved slider in accordance with the previous objects that is made of cloth having at least one retaining structure to secure the stiffening element to the cloth of the slider.

Another object of the present invention is to provide an improved slider in accordance with the previous objects in which the retaining structure includes an aperture through which the retaining structure is inserted.

Yet a further object of the present invention is to provide an improved slider in accordance with the previous objects in which the aperture of the retaining structure includes at least one tubular channel, the stiffening element being inserted into the channel and extending within the channel across the span of the short axis of the slider from one side to the opposite side thereof.

Another object of the present invention is to provide an improved slider in accordance with the previous objects that includes a plurality of stiffening elements secured by a plurality of retaining structures that are spaced from one another and positioned inwardly from the outer edges of the slider or at the slider edges.

Yet another object of the present invention is to provide an improved slider in accordance with the previous objects in which the stiffening elements include flexible rods and the retaining structures are channels sewn into or attached to the slider material, the flexible rods being inserted within the channels to extend across the short axis span of the slider to add rigidity to the slider body in the fore/aft direction.

Still another object of the present invention to provide an improved slider in accordance with the previous object in which the flexible rods are made of a solid monofilament nylon polymer.

Yet a further object of the present invention is to provide an improved slider in accordance with the previous objects that is not complex in structure and which can be manufactured at low cost and efficiently constructed.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Although several embodiments of the invention are disclosed herein, it is to be understood that these embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 6:
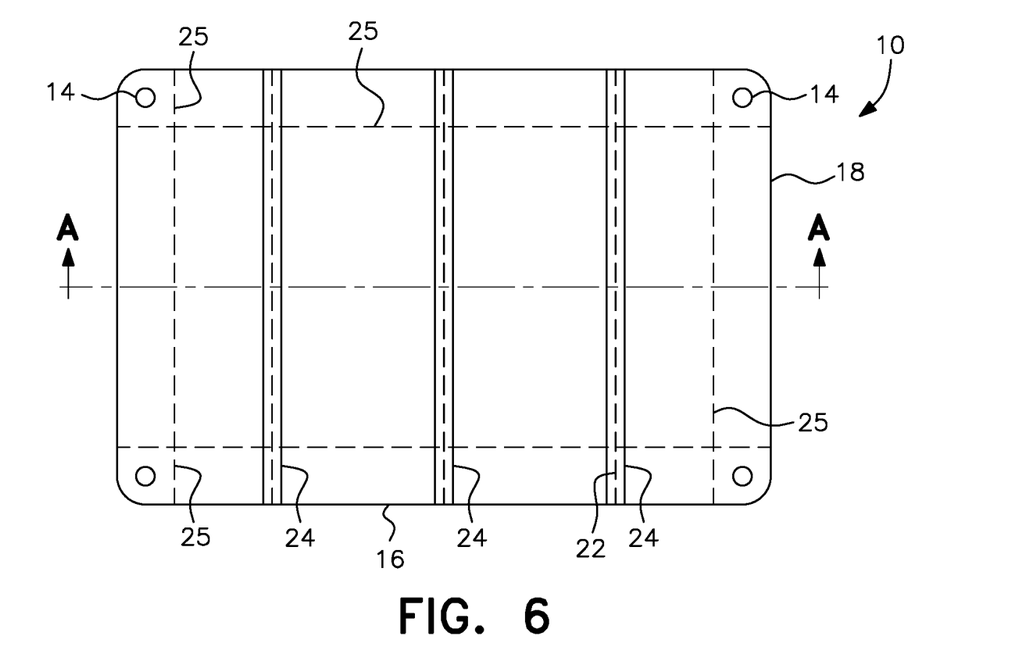
FIG. 6 is a plan view of a slider with channels for insertion of stiffening elements therein in accordance with a first embodiment of the present invention.
Figure 7:
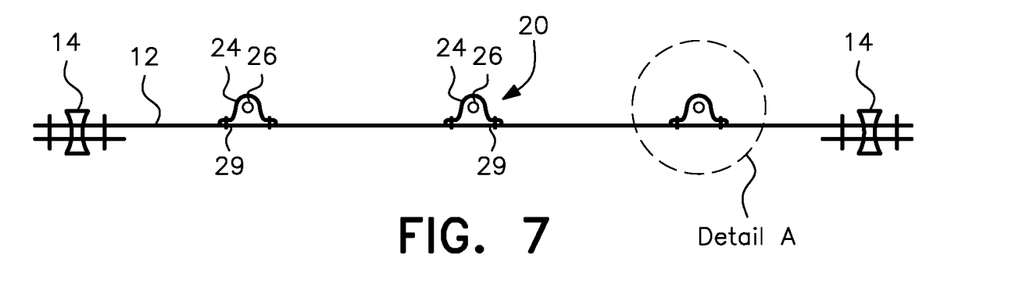
FIG. 7 is a sectional view taken along line A-A of FIG. 6 showing the channels in the slider fabric extending along the short axis of the slider and the stiffening elements (in dashed lines) fitted within the channels.

As shown in FIGS. 6 and 7, the present invention is directed to an improved "silent" slider generally designated by reference numeral 10. In the embodiments shown herein, the slider 10 is used with unmanned ram air parachutes. However, the slider may be used with other types of parachutes including those being used by a jumper as well as with single surface or other "gliding" parachutes.

The slider 10 includes a generally rectangular body 12, typically made of fabric or cloth material. Alternatively, the slider could be made of carbon fiber or fiberglass embodied as a "solid" slider that would not flap. However, while recognizing these possible alternatives, in a preferred embodiment of the present invention as described herein, the slider is made of a fabric or cloth material.

The slider body 12 has grommets 14 in the corners through which the suspension lines of the parachute run as is known in the art. The body has a longitudinal or long axis 16 and a lateral or short axis 18. The longitudinal axis is generally parallel with the long axis of the ram air canopy when inflated. The body 12 includes at least one retaining structure, generally designated by reference numeral 20, configured to secure a stiffening element, generally designated by reference numeral 22, that extends in the fore/aft direction along the short axis 18 of the slider. Strips of wide tape 25 are also typically sewn to the slider to help carry the drag load of the main fabric panel as well as the spreading load between the grommets 14 from the suspension lines.

Figure 7A:
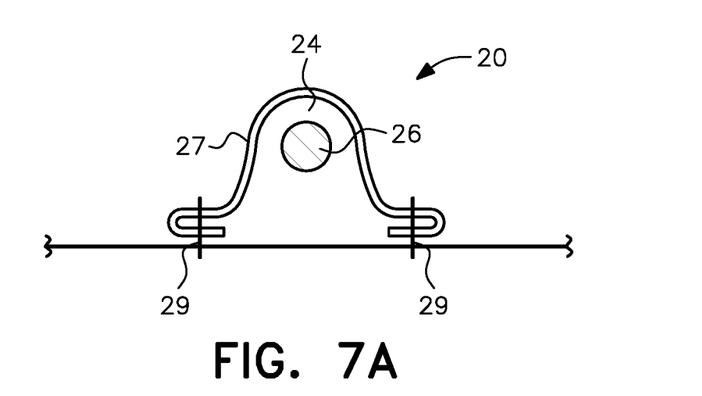
FIG. 7A is an enlarged view of Detail A shown in FIG. 7.
Figure 7B:
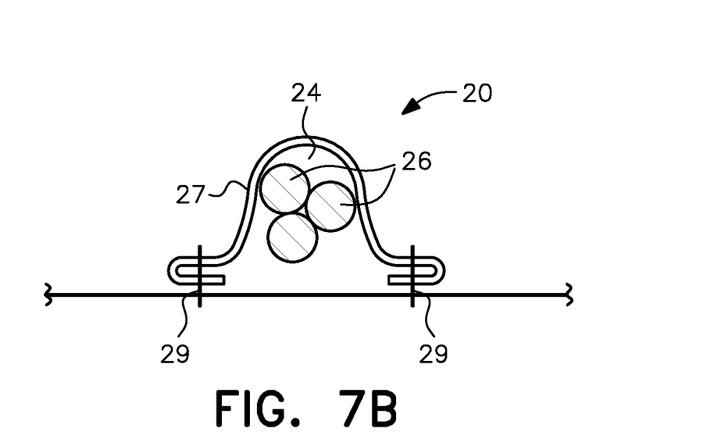
FIG. 7B is a cross-sectional view of a channel like that in FIG. 7A but having three stiffening elements with circular cross section fitted therein.
Figure 7C:
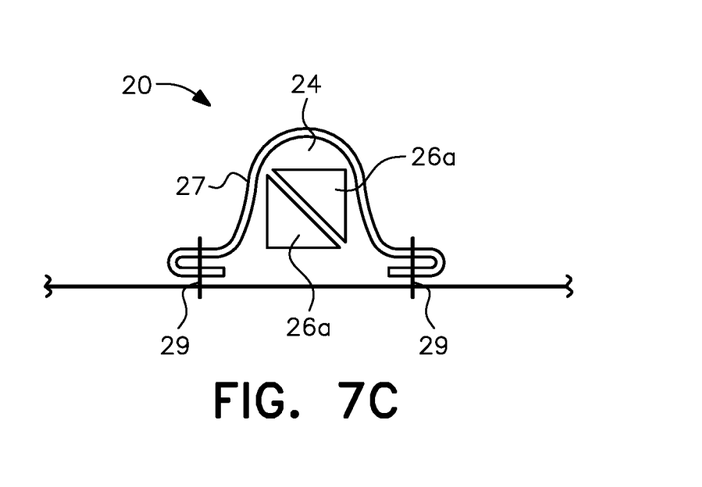
FIG. 7C is a cross-sectional view of a channel like that in FIG. 7A but having two stiffening elements with triangular cross section fitted therein.

According to the first embodiment shown in FIGS. 6, 7 and 7A, the retaining structure 20 includes a plurality of fore/aft extending channels 24. As best seen in FIGS. 7A, 7B and 7C, the channels are formed by attaching a separate piece of material 27 onto the slider with stitches 29. The channels could also be formed by creating a "crease" or a fold in the slider material that is secured in place by sewing or other means. While three channels 24 are shown in FIG. 7, additional channels may be provided. It is also possible to have only one channel, but the stiffness of the slider is better distributed by having two or more channels extending along the short axis.

According to one embodiment, the stiffening element 22 includes a length of stiff yet flexible material that is inserted within each of the channels. The stiffening element is made of a material that is able to bend without breaking and, when restricted from buckling by the channel, is preferably able to bear a compressive load. More particularly, the slider is not necessarily under fore/aft tension such that the stiffener may not be under compression. However, the present invention is effective when the slider is under tension (fore/aft) and the stiffener is thus under compression. The bending stiffness of the material is selected according to the intended use, with the appropriate stiffness and number of stiffening element locations varying with the size, flying airspeed, grommet number and weight of the slider material, among other factors.

A preferred material for the stiffening element 22 is a flexible rod made of a solid monofilament nylon material, such as solid nylon 66 or nylon 6 monofilament. The monofilament nylon rod may be made by extrusion, although extrusion is not required, without curvature or spooling so as to be substantially straight. Rods having a circular cross section can have a diameter of about 0.155 inches, with the lower end of the Flexural Modulus for this material being approximately 350 ksi. A preferred monofilament material typically has a diameter of between about 0.080 inches and about 0.155 inches, although larger diameter rods may be used with larger sliders. A rod with a 0.080 inch diameter of this material generally has a minimum Flexural Modulus of about 350 ksi.

According to one preferred embodiment shown in FIG. 7B, three stiffening elements 26 having a circular cross section of the noted diameter are placed in each of the three channels of a slider having a slider body with dimensions of about 32.5 inches by about 29.5 inches. The target flexure properties of this preferred configuration of three channels with three stiffening elements per channel may be defined by a stiffening element to slider area design ratio whereby the volume of the stiffening element is divided by the area of the slider body. In this example, the total volume of nine stiffening elements, each with a diameter of 0.155 inches and a length of 29.5 inches, is 5.007 cubic inches divided by the area of the slider, i.e., 958.75 square inches, produces a stiffening element to slider ratio of about 0.0052:1 ($5.2:10^{-3}$).

Maintaining the stiffening element to slider ratio as a minimum metric, and using the same stiffening element material, sliders of smaller and larger sizes capable of exhibiting similar performance characteristics may be effectively produced by modulating the number of flexible rods and channels. As would be understood by persons of ordinary skill in the art, more rods in fewer channels or fewer rods in more channels could achieve substantially the same result. For example, if six rods are to be used, equivalent results could be obtained by having two rods in each of three channels, three rods in each of two channels, or six rods in one channel.

In the embodiment shown in FIGS. 7 and 7A, the stiffening element is a single flexible rod 26 having a generally circular cross-section but other cross-sectional shapes could also be used provided the target flexure properties are achieved. For example, according to another preferred embodiment, the rods are made of nylon 6 monofilament with a Flexibility Modulus of about 350 ksi and Youngs Modulus (E) of about 350 ksi and have a triangular cross section as shown in FIG. 7C. As seen in cross section, the triangle has a base of about 0.155 inches and a height of about 0.134 inches, with a moment of inertia (I) equal to $bh^3$ divided by 36. The angle of bend (theta) is equal to ML/EI, where M is the moment and L is the length of the rod. Accordingly, where I is equal to about $1.041E-05$ $in^4$, E is about 350,000 psi, M is 0.25 pound force inches (lbf*in) and L is one inch, the angular deflection (Theta=dy/dx) is about 0.068, or approximately 3.92 degrees. Thus, the target resulting bending for a given net moment force is about 3.9 degrees of bending per inch length of stiffening element per moment force of M=0.25 lbf*in. However, more broadly, the degree of bending per inch length of the stiffening element, with a moment force of 0.25 lbf*in, may range from about 3 deg/in to about 5 deg/in.

For a slider having the dimensions of 32.5 inches by 29.5 inches, the desired degree of bending may be achieved using 6 triangular cross section rods in parallel with one another, such as three rods in each of two channels (not shown), or alternatively two rods 26a per channel as shown in FIG. 7C, as would be used with the slider configuration depicted in FIG. 7 in which the slider has three channels. In order for the slider stiffening elements to maintain about 3.92 deg/inch of bending, this equates to a net moment force of the calculated moment (M=0.25 lbf*in) times the number of elements (6), resulting in 1.5 inch pounds (1b*in).

It is assumed that the needed net moment force to control about 3.9 deg/in of bending per inch length of the rod is proportional to about 1.5 pounds per inch (lb*in) over the slider area. A slider of 100 inches by 50 inches has an area of 5000 square inches, meaning the slider must manage a moment force of about 7.82 lb*in. Given the moment of 0.25 lbf*in per stiffening element of nylon 6 with triangular cross section according to the instant embodiment, about 31.29 total stiffening elements are required.

Another way to quantify the needed flexure is by using a bending spring rate of K is equal to about 3.64 lb*in, where K is equal to M/Theta. Using the bending spring rate may be preferable in at least some cases such as with other moments or angular deflections. The bending spring rate (K) may range from about 2.94 lb*in to about 4.8 lb*in.

While nylon 6 and nylon 66 monofilament have been disclosed herein as suitable materials for the stiffening elements, one alternative material is polypropylene with a Youngs Modulus of about 250 ksi. Using rods of triangular cross section with a base of about 0.169 inches and a height of about 0.146, where I is equal to about $1.471E-05$ $in^4$, E is about 250,000 psi, M is 0.25 pound force inches (lbf*in) and L is one inch, the angular deflection (Theta=dy/dx) is about 0.067, or approximately 3.89 degrees. Thus, the target resulting bending for a given net moment force is about 3.9 degrees of bending per inch length of stiffening element per moment force of M=0.25 lbf*in. As shown, a triangle base of about 0.169 inches would be required when using polypropylene to achieve the desired degree of bending.

Rods of polypropylene having a Youngs Modulus of about 250 ksi may also have a circular cross section. In this example, the diameter of the rods needs to be about 0.131 inches with a radius of about 0.0655 inches, with I (I=¼) being about $1.445E-05$ $in^4$, E being about 250,000 psi, M being 0.25 pound force inches (lbf*in) and L being one inch, to obtain an angular deflection (Theta=dy/dx) of about 0.069, or approximately 3.9 degrees.

Other materials exhibiting the necessary balance of flexibility and stiffness could also be used with comparably effective results, such as plastics, silicone, teflon or rubber (possibly blended with polymers), spring steel, blended polymers/nylons, and the like, provided a flexural equivalent similar to the examples just described above, is maintained. When made with a suitable material, the stiffening element is flexible enough to allow for packing of the parachute while being stiff enough upon opening of the canopy to keep the slider spread open and prevent flapping thereof during flight.

Figure 8:
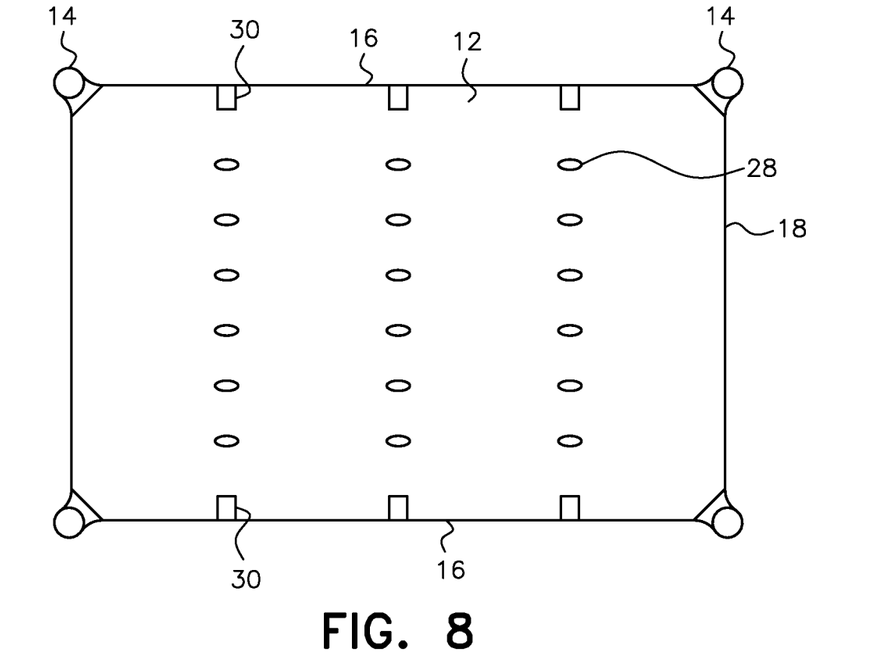
FIG. 8 is a plan view of a slider with slits formed in one layer of the fabric for insertion of stiffening elements in accordance with a second embodiment of the present invention.
Figure 9:
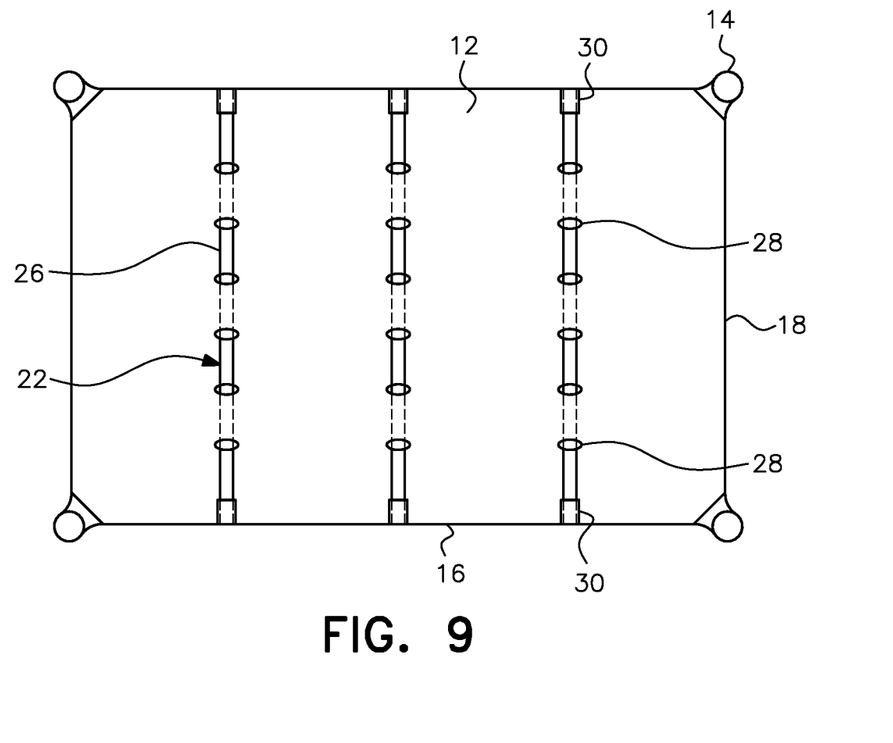
FIG. 9 shows the slider of FIG. 8 with the stiffening elements inserted through the slits and extending along across the short axis of the slider.

As shown in FIG. 8, the retaining structure 20 may include a plurality of spaced slits 28 formed in one layer of the fabric for insertion of the stiffening elements 22 according to a second embodiment of the present invention. It is preferred that the slider have more than one layer of fabric material so that the slits, which are formed in only one of the layers, do not create apertures or open areas in the slider that could impair the slider's function. A slider with only a single layer of material could be used, but this is not the preferred embodiment. The stiffening elements 22, which may be flexible rods 26, are routed through the slits to extend in the fore/aft direction along the short axis 18 of the slider as shown in FIG. 9, and secured in blind end channels 30 formed along the longitudinal front and rear edges of the slider.

Figure 10:
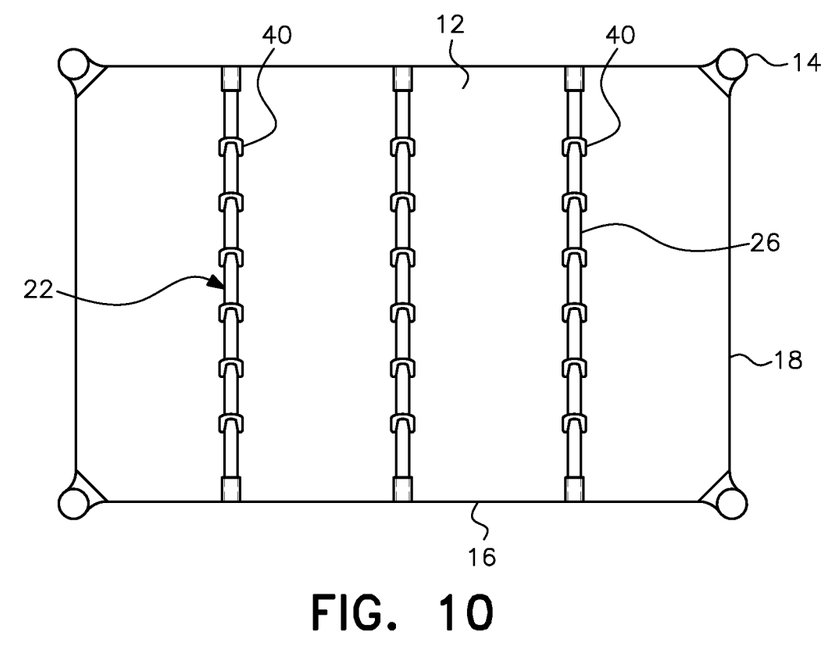
FIG. 10 is a plan view of a slider with spaced loops attached to or formed on a top surface of the slider into which stiffening elements have been inserted to extend along the short axis of the slider body in accordance with a third embodiment of the present invention.

The retaining structure 20 may also be embodied as a plurality of loops 40 according to a third embodiment shown in FIG. 10. The loops 40 are aligned with and spaced from one another to create a virtual channel extending along the short axis of the slider in the fore/aft direction as in the first two embodiments. The stiffening element 22, such as flexible rod 26, is inserted through each virtual channel and preferably secured in blind end channels 30 formed along the longitudinal front and rear edges of the slider as in the second embodiment.

Figure 11:
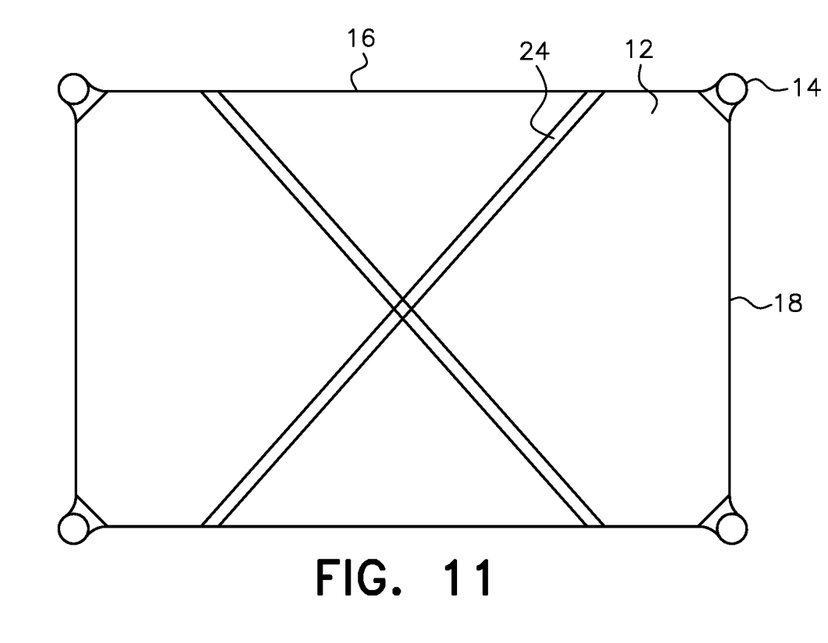
FIG. 11 is a plan view of a slider with channels attached to or formed in the slider into which stiffening elements have been inserted to extend diagonally across the short axis of the slider body in accordance with a fourth embodiment of the present invention.
Figure 12:
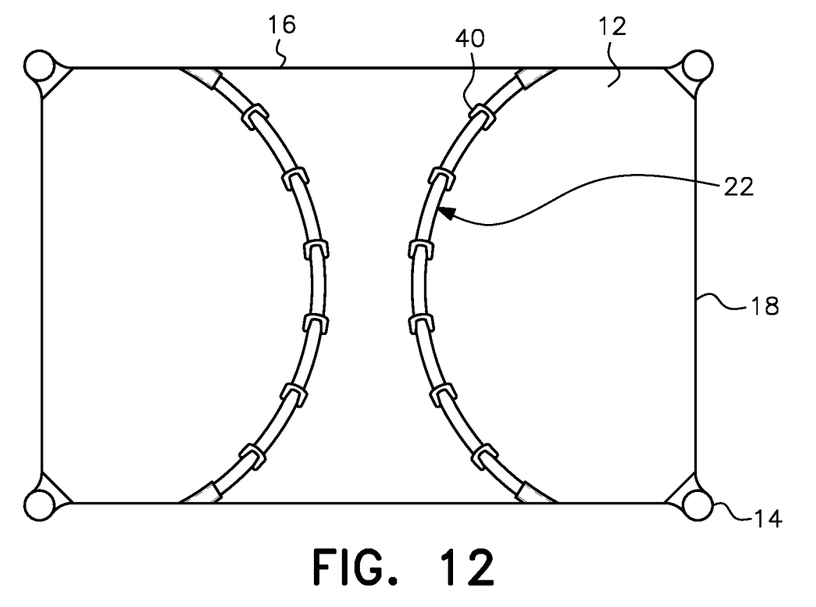
FIG. 12 is a plan view of a slider with spaced loops attached to or formed in the slider into which stiffening elements have been inserted to extend on opposed curved lines across the short axis of the slider body in accordance with a fifth embodiment of the present invention.

While the first three embodiments provide for stiffening elements that extend fore/aft in substantially a straight line across the body of the slider and parallel with the short axis, the present invention may also be embodied with retaining elements that secure the stiffening elements in other configurations. For example, the present invention may be embodied with channels attached to or formed on the top surface of the slider into which stiffening elements 22 are inserted to extend diagonally across the short axis of the slider body in accordance with a fourth embodiment of the present invention as shown in FIG. 11. A fifth embodiment is shown in FIG. 12 where spaced loops 40 have been attached to or formed in the slider so that the stiffening elements 22, when inserted through the loops 40, extend in opposed curved lines across the short axis of the slider body.

Figures 13, 14:
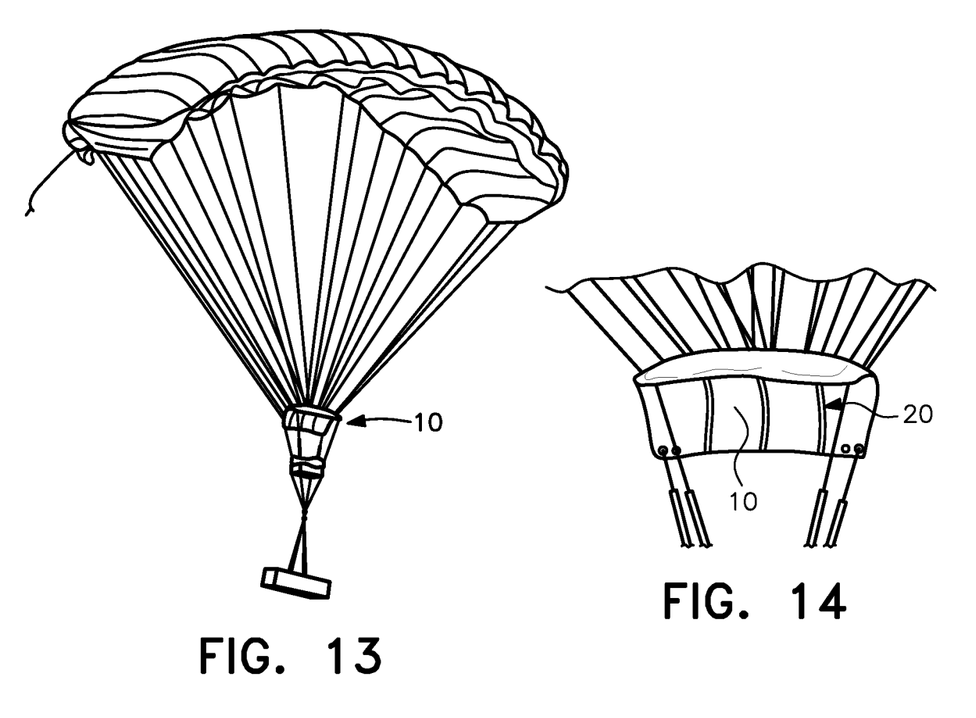
FIG. 13 is a front view of a fully inflated ram air parachute with a slider kept spread open by the stiffening elements and not flapping in accordance with the present invention.
FIG. 14 is a lower perspective view of the slider shown in FIG. 13 showing the slider held open in the fore/aft direction by the stiffening elements to prevent flapping.

As shown in FIGS. 13 and 14, when deployed with a ram air parachute, the short axis of the silent slider is made more rigid by the stiffening elements after the ram air parachute has fully inflated and the slider has moved to its lowermost position. The peripherally directed rigidity applied by the stiffening elements prevents the slider from folding along its short axis and creating the flapping noise attendant thereto.

The present invention is also directed to a method of retrofitting a slider to prevent flapping and noise after the canopy has opened. To retrofit an existing slider, the slider is provided with a plurality of retaining structures on one side of the slider. Stiffening elements are then secured within the retaining structures, the stiffening elements serving to keep the slider spread open in the fore/aft direction when the parachute is fully inflated.

The step of providing the slider with retaining structures may include forming a plurality of channels extending in the fore/aft direction in the material of the slider body, such as by sewing. The stiffening elements are secured within the retaining structures through insertion thereof into the channels. Other means of securing the retaining structures to the slider could alternatively be used such as gluing, riveting, grommeting, welding, and the like, but it is preferred that the stiffeners are not permanently attached but instead are removable and replaceable.

The step of providing the slider with retaining structures may alternatively include forming slits in one layer of the slider through which the stiffening elements are routed. A further alternative is to form loops aligned with and laterally spaced from one another to form virtual channels extending parallel with the short axis through which the stiffening elements are inserted.

In sum, the improved slider, according to the present invention, remains stiff along its short axis following inflation of the parachute canopy. By retaining stiffness in the slider, the slider remains spread open and cannot fold upon itself. As a result, flapping of the slider and the noise attendant thereto is prevented.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An improved slider for use with a ram air parachute having a canopy and suspension lines, the slider for slowing and controlling opening of the canopy when the parachute is deployed, the slider starting at a position adjacent a bottom of the canopy when the parachute is deployed and then being pushed downwardly as the canopy spreads and pulls outwardly on the suspension lines, the slider reaching a lower position on the suspension lines when the canopy is fully inflated, the slider comprising:

a generally rectangular body having corner grommets through which the suspension lines of the parachute pass, the body having a long axis and a short axis, the long axis being generally parallel with the longitudinal span of the ram air parachute canopy when fully inflated and having a leading edge facing the relative wind during flight of the parachute and an opposite trailing edge, the short axis extending in a fore/aft direction that is generally perpendicular to the long axis;

the body of the slider having a plurality of channels and a plurality of flexible rods inserted within said channels, respectively, said plurality of rods extending in the fore/aft direction to keep the slider spread open between the leading and trailing edges when the ram air parachute is fully inflated to reduce folding and flapping of the slider when the slider is in the lower position.

2. The improved slider as set forth in claim 1, wherein the channels are sewn onto the slider body.

3. The improved slider as set forth in claim 2, wherein the flexible rods are made of a flexible nylon polymer monofilament.

4. The improved slider according to claim 3, wherein the flexible nylon polymer monofilament rods have a diameter of between 0.080 inches and 0.155 inches.

5. A ram air parachute comprising:

a ram air canopy having suspension lines connected thereto that is inflated upon deployment of the parachute; and a slider for slowing and controlling opening of the canopy when the parachute is deployed, the slider having a longitudinal axis and a lateral axis with a generally rectangular body having corner grommets through which the suspension lines of the parachute pass, the longitudinal axis being generally parallel with a long axis of the ram air canopy when inflated, said lateral axis extending in a direction generally perpendicular to said longitudinal axis, the slider having a retaining structure that includes a channel formed on the body of the slider that extends along the lateral axis in a fore/aft direction, the slider starting at a position adjacent a bottom of the canopy when the parachute is deployed and then being pushed downwardly along the suspension lines as the canopy spreads out, the slider reaching a lowermost position on the suspension lines when the canopy is fully inflated; and a stiffening element that is secured to the slider by being inserted within the channel of the retaining structure, the stiffening element being made of a material that is able to bend without breaking in order to allow for packing of the parachute while being stiff enough upon opening of the canopy to stiffen the slider in the fore/aft direction to resist folding of the slider along the lateral axis and reduce flapping when the canopy is fully inflated and the slider has moved to said lowermost position.

6. The ram air parachute according to claim 5, wherein the retaining structure includes a plurality of channels formed on the body of the slider and extending in the fore/aft direction and longitudinally spaced from one another, said stiffening element including a plurality of stiffening elements inserted within the plurality of channels, respectively.

7. The ram air parachute according to claim 6, wherein the stiffening elements are flexible rods made of a solid monofilament nylon polymer.

8. The ram air parachute according to claim 7, wherein the flexible rods have a diameter of between 0.080 inches and 0.155 inches.

9. A method of retrofitting a slider to reduce flapping and noise when the slider, which is used to slow canopy opening of an unmanned ram air parachute, has reached a lowermost position upon full inflation of the canopy, comprising:

providing the slider with a plurality of retaining structures that extend in a fore/aft direction between a leading edge of the slider that faces the relative wind during descent and an opposite trailing edge, the leading and trailing edges of the slider being generally parallel with a longitudinal axis of the slider, the plurality of retaining structures being longitudinally spaced from one another and being formed by sewing a plurality of channels on the slider; and securing stiffening elements formed as flexible rods to the slider by inserting the rods into the channel so that the rods extend end in the fore/aft direction bet we the slider leading and trailing edges, the stiffening elements, as retained on the slider by the retaining structures, serving to keep the slider spread open in the fore/aft direction when the parachute is fully inflated and the slider has reached its lowermost position.

10. The method as set forth in claim 9, wherein said flexible rods are made of a nylon polymer monofilament.

11. A parachute assembly comprising:

a parachute having suspension lines connected to a canopy that is inflated upon parachute deployment; and a slider for slowing and controlling opening of the canopy when the parachute is deployed, the slider starting at an upper position adjacent a bottom of the canopy when the parachute is deployed and then being pushed downwardly as the canopy spreads and pulls outwardly on the suspension lines, the slider reaching a lower position on the suspension lines when the canopy is fully inflated, the slider having a leading edge and an opposite trailing edge, the leading edge facing the relative wind during descent of the parachute assembly, the slider having at least one channel extending in a fore/aft direction with a flexible rod inserted therein that stiffens the slider in the fore/aft direction to keep the slider spread open between the leading and trailing edges and reduce folding and flapping of the slider when the canopy is fully inflated and the slider is in the lower position.

12. The parachute assembly as set forth in claim 11, wherein the parachute is a ram-air parachute.

* * * * *